United States Patent [19]

Pinter

[11] Patent Number: 5,894,506
[45] Date of Patent: Apr. 13, 1999

[54] METHOD AND APPARATUS FOR GENERATING AND COMMUNICATING MESSAGES BETWEEN SUBSCRIBERS TO AN ELECTRONIC MESSAGING NETWORK

[75] Inventor: Gregory J. Pinter, Brandon, Miss.

[73] Assignee: SkyTel Communications, Inc., Jackson, Miss.

[21] Appl. No.: 08/708,696

[22] Filed: Sep. 5, 1996

[51] Int. Cl.[6] .................................................. H04M 1/64
[52] U.S. Cl. .......................... 379/88.23; 379/88.15; 379/93.24; 340/825.44; 455/412
[58] Field of Search .......................... 379/67, 88, 89, 379/93.24, 93.25, 93.26; 455/31.3, 31.2; 395/200.3, 200.31, 200.34, 200.37, 200.41

[56] References Cited

U.S. PATENT DOCUMENTS

| | | | |
|---|---|---|---|
| 2,978,676 | 4/1961 | Spencer | 340/154 |
| 3,513,443 | 5/1970 | Andersen | 340/164 |
| 3,714,375 | 1/1973 | Stover | 179/2 |
| 3,818,145 | 6/1974 | Hanway | 179/41 |
| 3,846,783 | 11/1974 | Apsell et al. | 340/311 |
| 3,851,251 | 11/1974 | Wigner et al. | 325/55 |
| 3,944,724 | 3/1976 | Kilby et al. | 178/4.1 |
| 3,976,995 | 8/1976 | Sebestyen | 340/337 |
| 3,984,775 | 10/1976 | Cariel et al. | 325/55 |
| 4,010,460 | 3/1977 | DeRosa | 340/311 |
| 4,010,461 | 3/1977 | Stodolski | 340/311 |
| 4,160,240 | 7/1979 | Partipilo | 340/311 |
| 4,178,475 | 12/1979 | Taylor et al. | 179/2 |
| 4,197,526 | 4/1980 | Levine | 340/311 |
| 4,249,165 | 2/1981 | Mori | 340/311 |
| 4,263,480 | 4/1981 | Levine | 179/2 |
| 4,330,780 | 5/1982 | Masaki | 340/825.44 |
| 4,336,524 | 6/1982 | Levine | 340/311 |
| 4,382,256 | 5/1983 | Nagata | 340/825.44 |
| 5,327,486 | 7/1994 | Wolff et al. | 379/210 |
| 5,381,466 | 1/1995 | Shibayama et al. | 379/88 |
| 5,539,808 | 7/1996 | Inniss et al. | 379/67 |

OTHER PUBLICATIONS

"New Radio Paging System," by Mitsuru Komura et al. Japan Telecommunications Review, Jul. 1977, vol. 19, No. 3, pp. 217 and 220–225.

"Paging System Broadcasts Nationwide on FM Radio Channel," Electronics International, Jan. 4, 1979, vol. 52, No. 1, pp. 67–68.

"A Development Project of a Pocketsize Receiver for a Nationwide Paging System," by Kari Kiishinen et al, IEEE, 1979, pp. 383–387.

*Primary Examiner*—Fan S. Tsang
*Attorney, Agent, or Firm*—Finnegan, Henderson, Farabow, Garrett & Dunner, L.L.P.

[57] ABSTRACT

An electronic messaging network comprises a network operation center and plural message terminals, all including memories for storing corresponding files of canned messages and associated message codes. To send a canned message, a calling party selects a canned message stored at one message terminal and transmits the assigned message code to a receiving party at another message terminal via the network operation center. The receiving terminal retrieves the selected canned message from its memory using the received message code for display to the receiving party. Files of canned responses and associated response codes may also be stored in the memories at the terminals and network operation center to allow the exchange of selected canned response options in conjunction with canned messages to be in response code form.

21 Claims, 7 Drawing Sheets

METHOD AND APPARATUS FOR GENERATING AND COMMUNICATING MESSAGES BETWEEN SUBSCRIBERS TO AN ELECTRONIC MESSAGING NETWORK

FIELD OF THE INVENTION

The present invention relates to electronic information services and more particularly to the exchange of electronic messages among subscribers to an electronic messaging network.

BACKGROUND OF THE INVENTION

As more and more people sign on to information networks, congestion of the communications links comprising these networks, both wireline and wireless, and the consequential transmission delays become increasingly significant problems. Faster transmission rates, data compression techniques, and more efficient spectrum utilization are among the approaches that have been considered, and to some extent implemented, to increase the capacities of communications links.

One area of particularly rapid growth is the electronic messaging field. More and more people are moving about with portable devices, such as laptop computers and portable digital devices, which can be economically equipped to function as message sending/receiving terminals. Moreover, wireless paging hardware, software, and support services are being upgraded to accommodate two-way messaging. That is, portable pagers are being developed not only to receiving paging messages, but also to send back a signal acknowledging receipt of a paging message or even a message answering the received paging message. While such upgraded paging services are highly desirable, they can severely strain the capacity of wireless paging channels.

SUMMARY OF THE INVENTION

It is accordingly a principle object of the present invention to provide an improved electronic messaging network and method, wherein communications link capacity is conserved by transmitting certain messages with an improved degree of message compression.

Particularly in the case of radio paging, many paging messages consists of a relatively small number of common phrases, such as "I am on the way home", "I am working late", "Can we meet for lunch", etc. This being the case, such commonly used phrases can be treated as "canned" messages that can be replaced by short message codes as simple as, for example, one or several ASCII characters.

The present invention takes advantage of this fact by providing, in accordance with one preferred embodiment, a method of communicating messages between subscribers of an electronic messaging network, comprising the steps of maintaining, at a network operation center, a first file of canned messages individually retrievable using unique, abbreviated message codes respectively assigned to the canned messages; maintaining, at a terminal of a calling subscriber, a second file of canned messages corresponding to the first file; selecting an appropriate canned message from the second file for transmission to a terminal of a designated receiving subscriber; sending the message code assigned to the selected canned message to the network operation center; retrieving the selected canned message from the first file using the message code received from the calling subscriber terminal; and communicating the selected canned message to the designated receiving party terminal where it is displayed.

In accordance with a feature of the present invention, the first and second canned message files may be updated, either by the network operation center or from a subscriber terminal in order to customize the canned messages according to the needs of a particular group or organization of subscribers. In addition, the canned messages may be phrased to accept the addition of one or more parameters, which are entered at the calling subscriber terminal and then included with the message codes sent to the network operation center. The selected canned messages are retrieved from the first file using the message codes and communicated to terminals of designated receiving subscribers with the added parameters incorporated in the bodies of the canned messages.

The present invention also accommodates the addition of multiple response options to the canned messages selected by calling subscribers. The multiple response options are then included with the canned message codes sent to the network operation center. The selected canned messages are then retrieved from the first file and communicated to the designated receiving subscribers, together with the added multiple response options. The receiving parties then select the appropriate one of the multiple options for transmission back to the appropriate calling subscribers via the network operation center. The multiple response options may also be canned responses maintained in files at the network operation center and the subscriber terminals and, like the canned messages, have assigned response codes that are handled in the same manner as the message codes.

In accordance with another feature of the present invention, corresponding canned message files are also maintained at receiving subscriber terminals, such that the canned messages may be communicated to the receiving subscribers in message code form. The received message codes are then used to retrieve the appropriate canned messages and multiple response options from stored files, and displayed by the receiving party terminals.

Additional features and advantages of the invention will be set forth in the description which follows, and in part will be apparent from the description, or may be learned by practice of the invention. The objectives and other advantages of the invention may be realized and attained by the method and apparatus particularly pointed out in the written description and the appended claims, as well as the accompanying drawings.

It will be understood that both the foregoing general description and the following detailed description are exemplary and explanatory and are intended to provide further explanation of the invention as claimed.

The accompanying drawings are intended to provide a further understanding of the invention and are incorporated in and constitute a part of the specification, illustrate a preferred embodiment of the invention, and, together with the description, serve to explain the principles of the invention.

BRIEF DESCRIPTION OF THE DRAWINGS

Corresponding reference numerals refer to like parts throughout the drawings.

DETAILED DESCRIPTION OF THE PREFERRED EMBODIMENT

Figure 1:
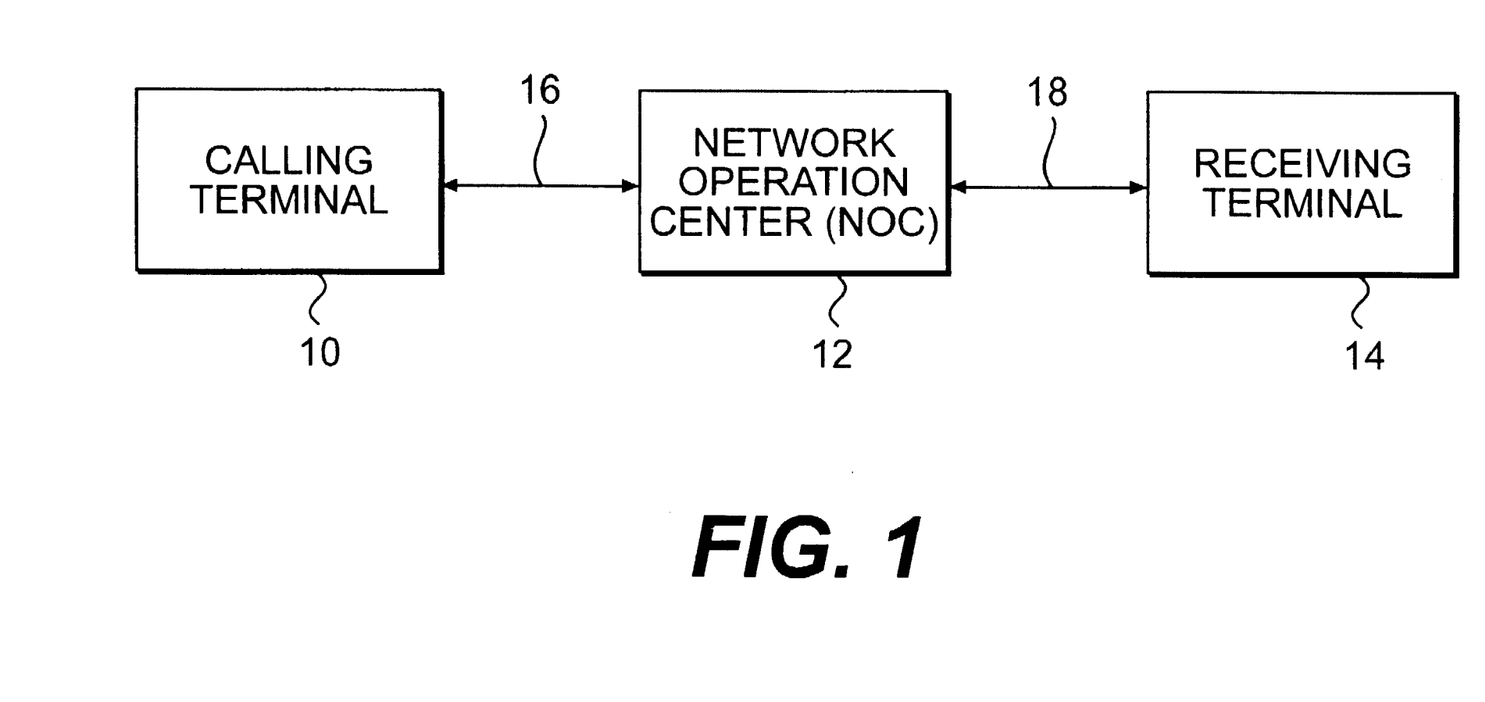
FIG. 1 is a block diagram illustrating an electronic messaging network utilized in the practice of a preferred embodiment of the present invention.

As seen in FIG. 1, an electronic messaging network in accordance with a preferred embodiment of the present invention includes, a calling party terminal 10, a network operation center (NOC) 12, and a receiving party terminal 14. It will be appreciated that, in practice, the network will include pluralities of calling and receiving party terminals. The calling party terminal 10 is connected to NOC 12 by a communications link 16, which may take the form of land line (e.g., phonelines), a direct computer link, a wireless link, or a satellite link. NOC 12 is preferably connected to receiving party terminal 14 by a wireless communications link 18. An example of a preferable network operation center that can be implemented in the practice of the present invention is the network operation center being developed by Destineer Corporation of Jackson, Miss. to handle their Nationwide Wireless Network (NWN) paging services. That NOC and a preferred two-way wireless network for implementing the present invention are described in U.S. patent application Ser. Number 08/124,216, the contents of which are hereby incorporated by reference.

In accordance with the present invention, calling terminal 10 includes a stored file of canned messages and associated canned message codes. Referring to the flow chart of FIG. 2, when a calling party wishes to send a message to a receiving party at terminal 14 (FIG. 1), the terminal retrieves the file of the canned messages from storage (step 22) and displays the file to the calling party (step 24). The calling party browses through the file to determine if the text of any of the canned messages is appropriate to convey the particular message that the calling party wishes to send to the receiving party. If an appropriate canned message is noted, the calling party selects this canned message (step 26) using suitable pointing means, such as a mouse, cursor, etc. Based on the canned message selection, terminal 10 retrieves the associated canned message code from the file (step 28).

Figure 2:
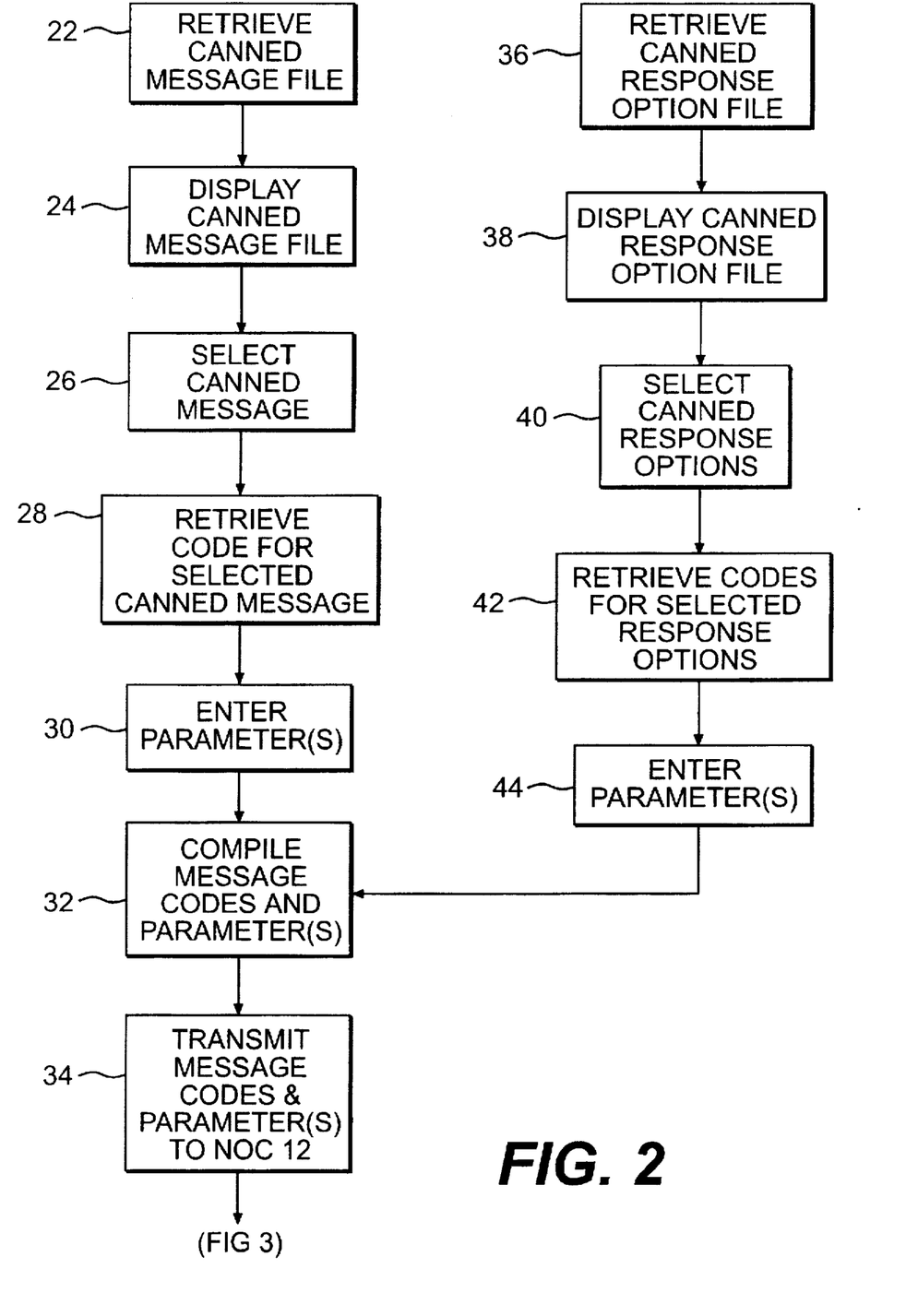
FIG. 2 is a flow diagram illustrating the operation of a calling terminal in the network of FIG. 1 when sending a message in accordance with one embodiment of the invention.

If the selected canned message calls for the inclusion of a parameter(s), such as, for example, time, date, phone number, etc., the calling party enters a desired parameter(s), using an appropriate entry device, such as a keypad (step 30). The calling terminal 10 compiles the retrieved message code associated with the selected canned message with an appropriate indicator code, calling and receiving terminal addresses, and added parameters, if any (step 32). Terminal 10 then transmits the compiled canned message codes and parameters, if any, together with calling and receiving terminal addresses to NOC 12 over communications link 16 (FIG. 1) (step 34).

Assume, for example, that the canned message selected by the calling party in step 26 is "I am on my way home". This canned message does not call for the addition of parameters. The associated code for this canned message, may be, for example, the number 36 in ASCII code. To indicate that number 36 is a canned message code, the calling terminal 10 adds a suitable indicator code, such as ASCII control character 26. Thus, the compiled canned message codes representing the canned message "I am on my way home" is transmitted in step 34 to NOC 12 simply as <26>36.

An example of a canned message calling for the inclusion of parameters may be "Call me at at phone number . This canned message calls for the calling party to fill in a desired time parameter and a phone number (step 30). Suppose the calling party wishes the receiving party to call him at 4 PM at phone number 555-1212, the following canned message codes are then compiled by the calling terminal 10 and transmitted to NOC 12 as:

<26>18<29>4PM<29>5551212 where:

<26> is an ASCII control character serving as a canned message indicator, 18 is the code associated with canned message "Call me at at phone number ", <29> is an ASCII control character serving as a parameter separator, and 4PM and 5551212 are the keyed-in parameters.

In addition to parameters, the present invention also provides for the addition of response options to certain canned messages typically posed as questions. To this end, terminal 10 maintains a file of canned response options. Then, if the calling party wishes to add response options to a selected canned message, the calling party accesses the canned response options file (step 36), which is then displayed by terminal 10 (step 38). The calling party browses through this file to determine which of the multiple response options are appropriate for addition to the selected canned message to be sent to the designated receiving party. The calling party selects the appropriate canned response options (step 40) in the same manner as in the selection of the canned message, and the calling terminal 10 retrieves the particular codes associated with the selected canned response options (step 42). If the selected canned response options call for the addition of parameters, such as time, the calling party enters the desired parameter(s) (step 44). The selected canned response codes and parameters are then compiled with the canned message code and any canned message parameters (step 32). The calling terminal then transmits the compiled canned message and response codes, together with any parameters to NOC 12 (step 34).

By way of example, if the selected canned message is "Can we sign the document first thing tomorrow?" followed by selected canned response options "yes", "no", and "change to 1 PM", the canned message codes and parameters transmitted to NOC 12 would preferably be as follows:

<26>62<31><26>1<31><26>2<31><26>7<29>1PM where:

<26> is an ASCII control character serving as the canned message and multiple response options indicator, <29> is an ASCII control character serving as the parameter separator, <31> is an ASCII control character unit separator used as a delineator separating multiple response options from the canned message and from each other, 62 is the code associated with canned message "Can we sign the document first thing tomorrow?", 1 is the code associated with canned response option "yes", 2 is the code associated with canned response option ¢no", 7 is the code associated with canned response option "change to", and 1PM is the keyed-in parameter.

The following example illustrates that, in some cases, parameters added to canned messages may be canned parameters also stored at the calling terminal 10. Such canned parameters may be included in the canned message file, the canned multiple response options file, or in a separate canned parameter file stored at the calling terminal. If canned parameters are stored in separate file from the canned message file and the canned multiple response option file, parameter selection by the calling party is achieved using a separate subroutine corresponding to the subroutine used to select canned multiple response options.

To illustrate this case, consider the canned message "Can we meet for lunch at or ?", and the selected multiple response options are "noon", "12:30" or "call me". The compilation of codes and parameters transmitted to NOC 12 would then be:

<26>10<26>15<29>12:30<31><26>15<31>12:30<31><26>8 where:

<26> is the ASCII control character serving as the canned message and multiple response options indicator, <31> is the ASCII control character serving as a delineator for separating the canned message and multiple response options from each other, <29> is the parameter separator, 10 is the code associated with canned message "Can we meet for lunch at or ?", 8 is the code associated with the canned parameter and response option "call me", 15 is the code associated with canned parameter and response option "noon", and 12:30 is the keyed-in parameter.

Figure 3:
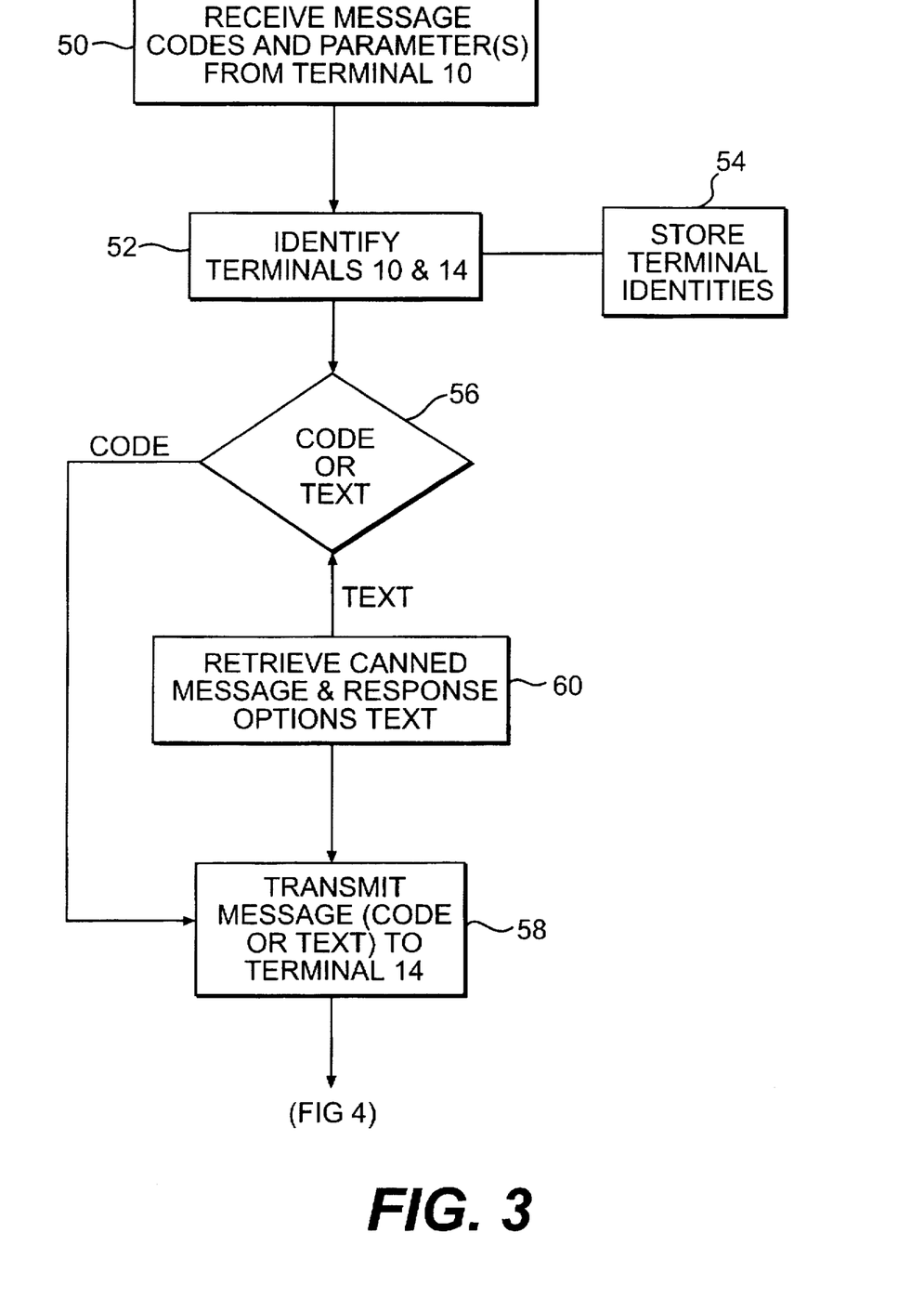
FIG. 3 is a flow diagram illustrating the operation of the network operation center (NOC) in the network of FIG. 1 when relaying a message from the calling terminal to the receiving terminal in accordance with one embodiment of the invention.

FIG. 3 illustrates the operation of NOC 12 in accordance with one embodiment of the invention. The canned message/ response option codes and any parameters transmitted by calling terminal 10 over communications link 16 are received by a NOC receiver (step 50). From the calling and receiving terminal addresses included with the canned message/response option codes, the identities of the calling and receiving terminals 10 and 14 (FIG. 1) are determined (step 52). These determinations are stored in memory (step 54). From the identity of the receiving terminal 14, NOC 12 determines if receiving terminal 14 is capable of accepting this particular canned message/response option. NOC 12 is programmed to make this determination for several reasons. For example, NOC 12 needs to know whether the designated receiving party is a member of a messaging group or organization that has established a file of customized canned messages and response options and thus has access to a terminal in which files of the customized canned messages/ response options and associated codes are stored in memory. Also, the files of canned messages may include both standard, network-wide canned messages and canned messages customized for a particular group. Thus, NOC 12 must determine whether the designated receiving party terminal can accept only standard canned messages/response options, only customized canned messages/response options or both. In any case, NOC 12 maintains multiple files of canned messages and canned response options, including files identical to those stored at calling terminal 10 and possibly also at receiving terminal 14.

Based on this determination, NOC 12 determines whether the designated receiving party terminal can accept the canned message in code form, i.e., as received from the sending party terminal, or whether the canned message must be transmitted in full text to the receiving party terminal (step 56). If the designated receiving terminal can accept canned message/response option codes, they are transmitted to the designated receiving party terminal in the same form as received from the sending party terminal (step 58). If the designated receiving party terminal is not equipped to process canned message/response option codes, NOC 12 uses the canned message/response option codes received from the calling party terminal 10 to retrieve from the appropriate file(s) the text of the associated canned message and multiple response options, if any, from a memory (step 60). The text of the canned message and response options, together with parameters, is then transmitted in standard message code format by NOC 12 to the receiving terminal (step 58).

Figure 4:
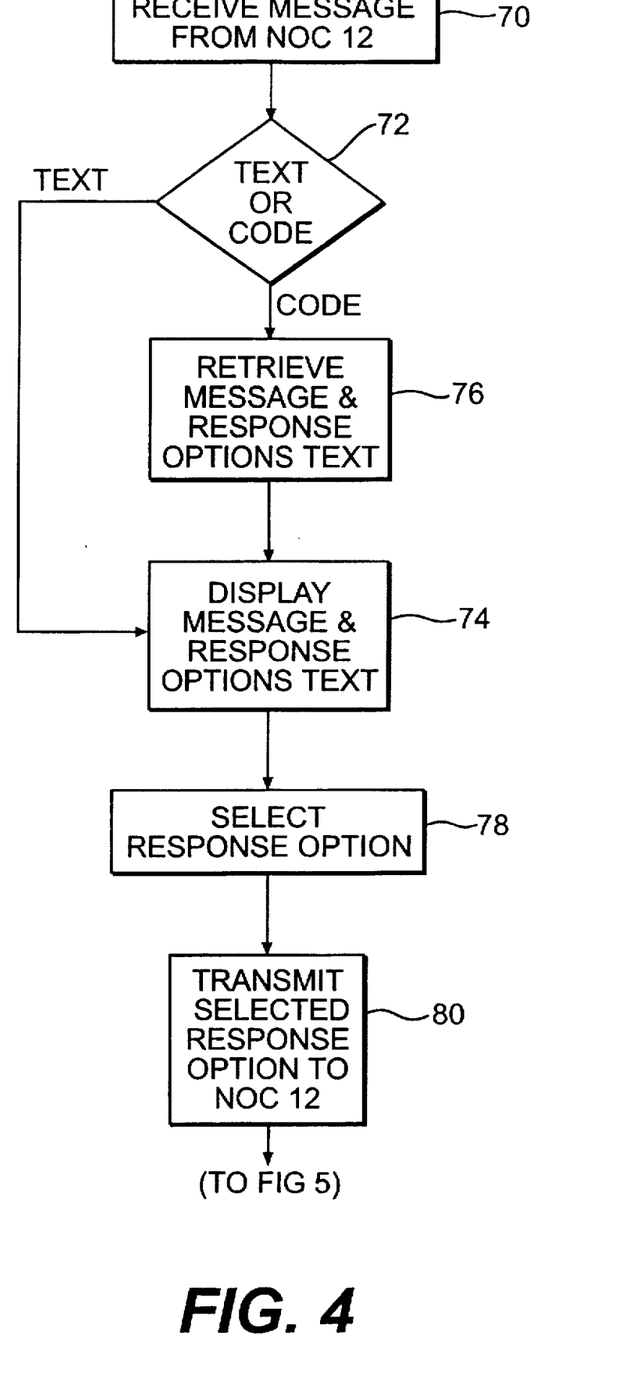
FIG. 4 is a flow diagram illustrating the operation of the receiving terminal in the network of FIG. 1 when receiving a message in accordance with one embodiment of the invention.

FIG. 4 illustrates the operation of receiving terminal 14 upon receiving a message transmission, according to an embodiment of the invention. Initially, terminal 14 receives the canned message/response option transmission from NOC 12 (step 70). The receiving terminal then determines whether the canned message/response option reception is in message text or canned message code (step 72). If in text, the canned message and any response options are displayed to the receiving party (step 74). Alternatively, if the reception is in canned message/response option codes, the receiving party terminal 14, using these codes, retrieves the associated canned messages, canned response options, and canned parameters from the various stored files identical to those stored at calling terminal 10 and NOC 12 (step 76). The retrieved canned message, response options, and parameters, if any, are displayed in text form for viewing by the receiving party terminal (step 74).

If any response options are included with the canned message, the receiving party selects the appropriate response option (step 78), which is then transmitted by the receiving terminal back to NOC 12 (step 80). Since a typical response option is very short, it can be efficiently transmitted back to NOC 12 in ASCII text code format. However, it will be appreciated that the receiving terminal may be so equipped that the code associated with the selected response, as received from NOC 12, may simply be transmitted back to the NOC 12 in response option code. Alternatively, the receiving terminal may be equipped with keys positioned in associated relation with the display of the multiple response options. Depression of any one of the keys selects the associated one of the response options, and a unique, simple code assigned to the depressed key is transmitted back to the NOC 12.

Figure 5:
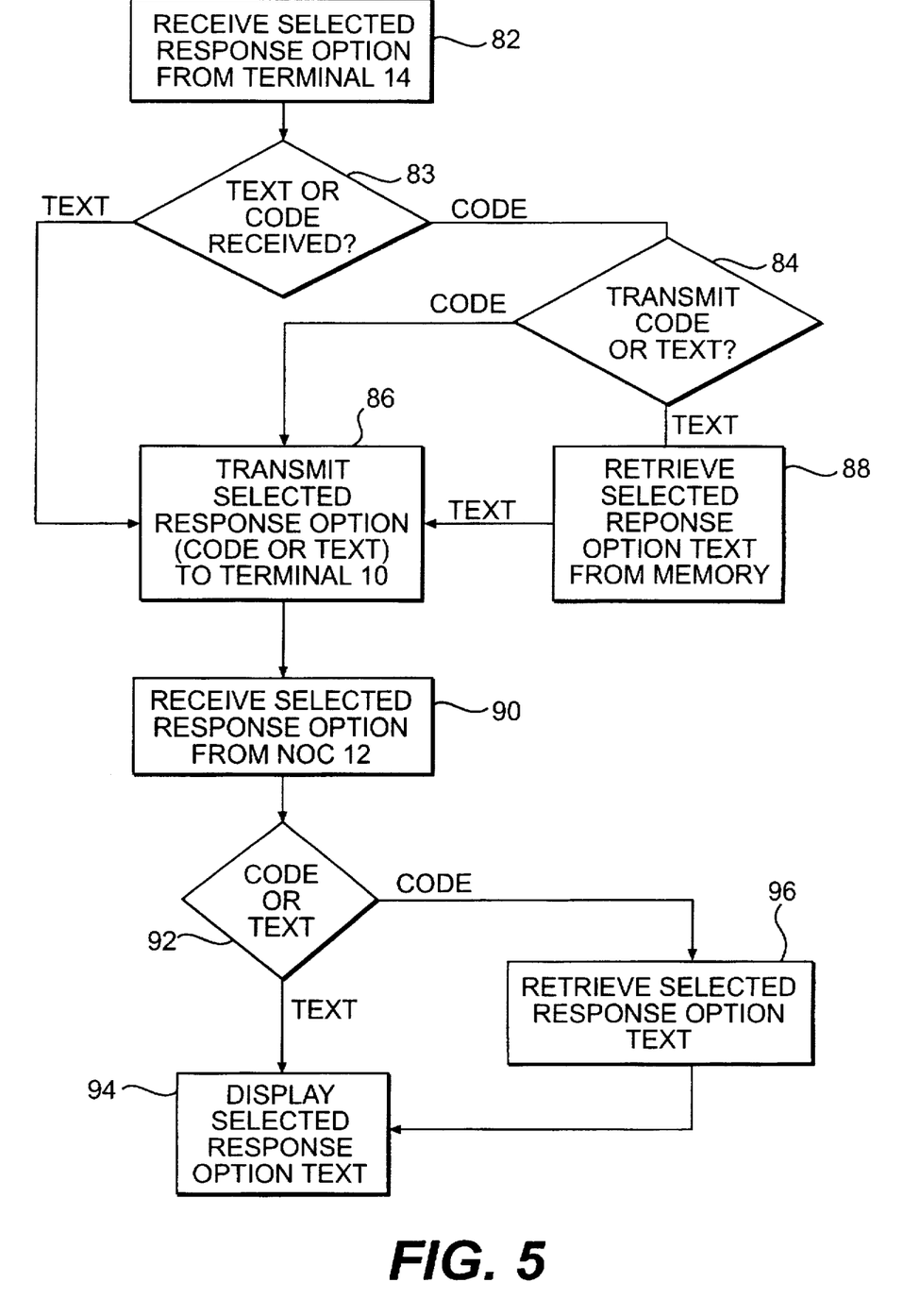
FIG. 5 is a flow diagram illustrating the operations of the NOC and the calling terminal regarding a message response from the receiving terminal in accordance with one embodiment of the invention.

FIG. 5 illustrates the operation of the NOC and the calling terminal in relaying a selected response option from the receiving terminal to the calling terminal in accordance with an embodiment of the invention. Initially, NOC 12 receives the selected response option transmitted by the receiving party terminal 14 (step 82). NOC then determines whether the received response option is in ASCII text code format or in canned response option code (step 83). If in text code, NOC simply relays the selected response option to the calling party terminal 10 (step 86). If the selected response option is received from the receiving party terminal in canned response option code, a decision is made whether to transmit the selected response option to the calling party terminal in canned response code or in ASCII text code (step 84). If the former, the canned response code is simply transmitted to the calling party terminal 10 as received from the receiving terminal (step 86). If in ASCII text code, NOC 12 is programmed to access its stored canned multiple response option file and, using the received response option code, retrieve the selected canned response option text (step 88), which is then transmitted in ASCII text code to the calling party terminal 10 (step 86).

The selected response option relayed by NOC 12 is received by calling terminal 10 (step 90), which then determines whether the response option is in text code format or canned response code (step 92). If in text code, the response option is decoded and displayed to the calling party (step 94). If the selected response option is in code form, the calling terminal simply accesses its stored response options file and, using the received response option code, retrieves the associated response option text (step 96), which is then displayed to the calling party (step 94).

Figure 6:
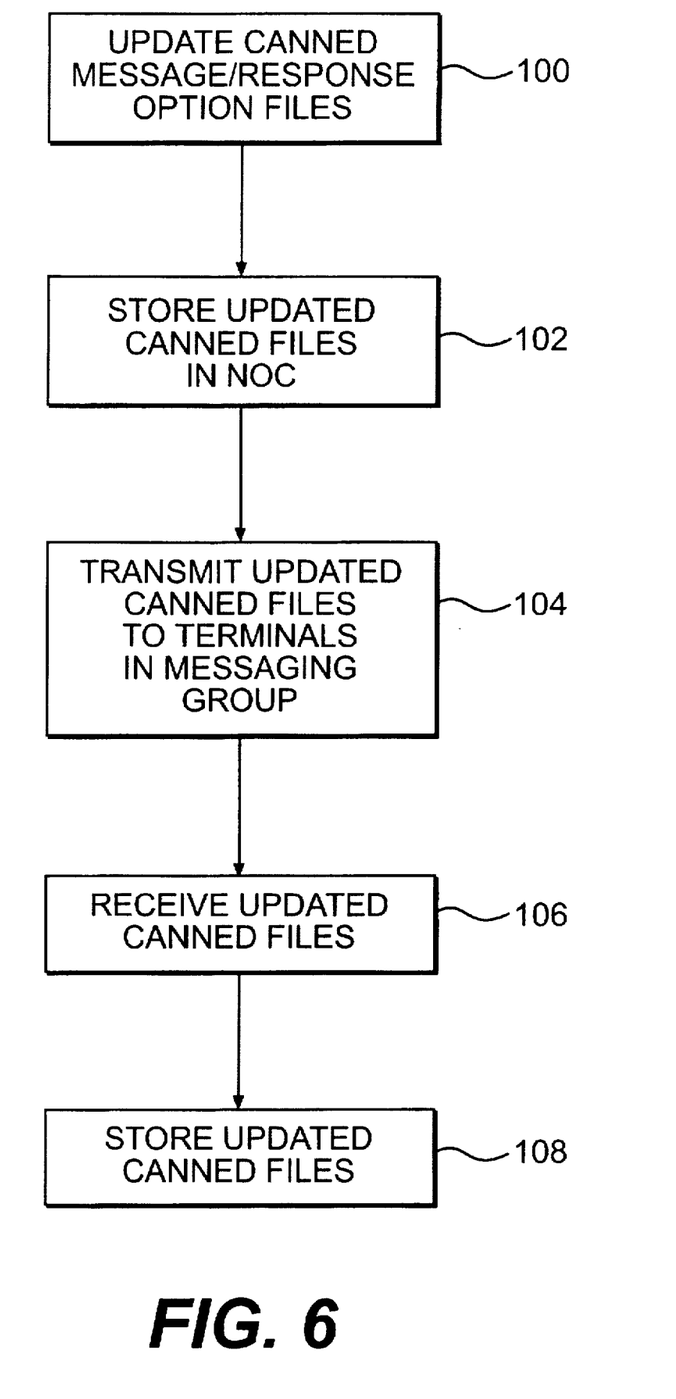
FIG. 6 is a flow diagram illustrating the network operation to update message files in the NOC and the calling/receiving terminals in accordance with one embodiment of the invention.

NOC 12, as part of its system responsibilities, is capable of updating the canned message, canned response option, and canned parameter files. FIG. 6 illustrates the procedure for updating these files in accordance with one embodiment of the invention. NOC 12 updates the files (step 100) and stores the canned file updates in the NOC memory (step 102). NOC 12 then transmits the updated canned files to all of the terminals in a particular two-way messaging group, including calling terminal 10 and receiving terminal 14 (step 104). The canned file updates are received by the messaging group terminals (step 106) and stored in the terminal memories (step 108). It will be appreciated that updated canned files may be created at one of the terminals and transmitted to NOC 12, which then operates to disseminate the file updates to other terminals of the messaging group.

As indicated above, the calling terminal 10 and NOC 12 are disclosed more fully in the cited application Ser. No. 08/124,216 and preferably comprise the structure disclosed in this application. For illustrative purposes, applicants include FIGS. 7 and 8 to illustrate preferred structure in block diagram form.

Figure 7:
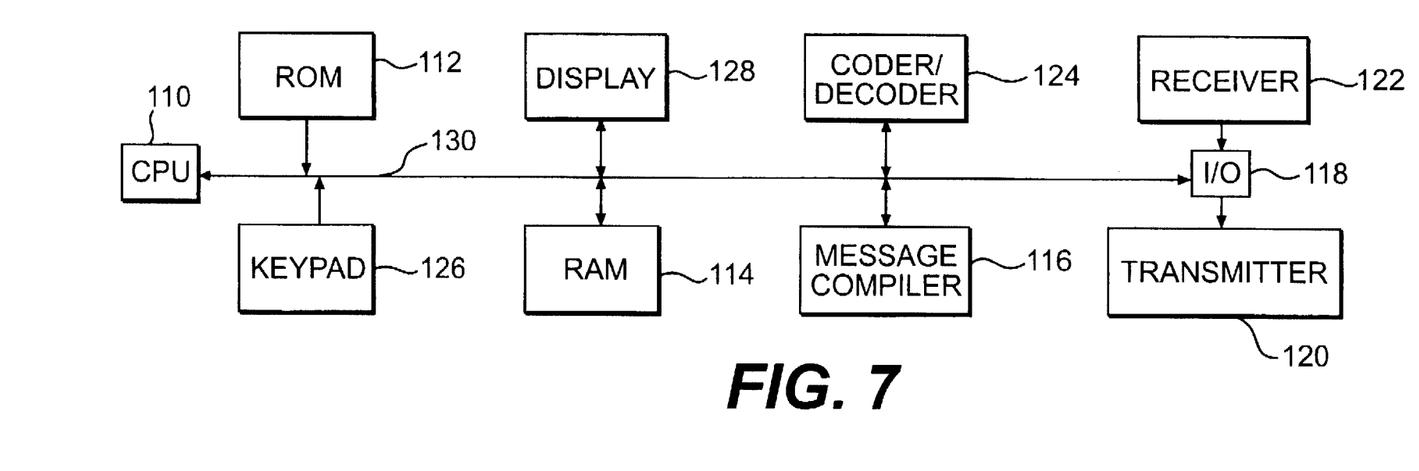
FIG. 7 is a schematic block diagram of the calling terminal of FIG. 1 in accordance with one embodiment of the invention.

A preferred structure of calling terminal 10 appropriate for practicing the present invention is illustrated in FIG. 7. As shown, the calling terminal 10 includes a CPU 110, a ROM 112 to store an application program for controlling terminal operation in accordance with the present invention, a RAM 114 to store the canned message/response options/parameter files and associated codes, and a compiler 116 for assembling the message/response options/parameter codes, indicator and separator codes, and address codes into a message under the control of the application program and CPU 110. Calling terminal 10 also includes an input/output (I/O) device 118 selectively connecting a transmitter 120 and a receiver 122 into the terminal circuitry. A coder/decoder 124 encodes text messages transmitted by the terminal to NOC 12 and decodes text messages received from NOC, including selected response options in text code received from a receiving terminal 14. A terminal keypad 126 is used by the calling party to designate a receiving party (typically by phone number), to retrieve canned message/response options/parameter files from RAM 114, to scroll through the displayed files, and to select the canned message/response options/parameter(s) appropriate for sending to the receiving party. Display 128 also displays selected response options from receiving parties relayed by NOC 12. These terminal components are interconnected in operative relation by a system bus 130. While FIG. 7 illustrates the operative structural configuration of calling terminal 10, it will be appreciated that, preferably, receiving terminal 14 is structurally configured in the same manner.

Figure 8:
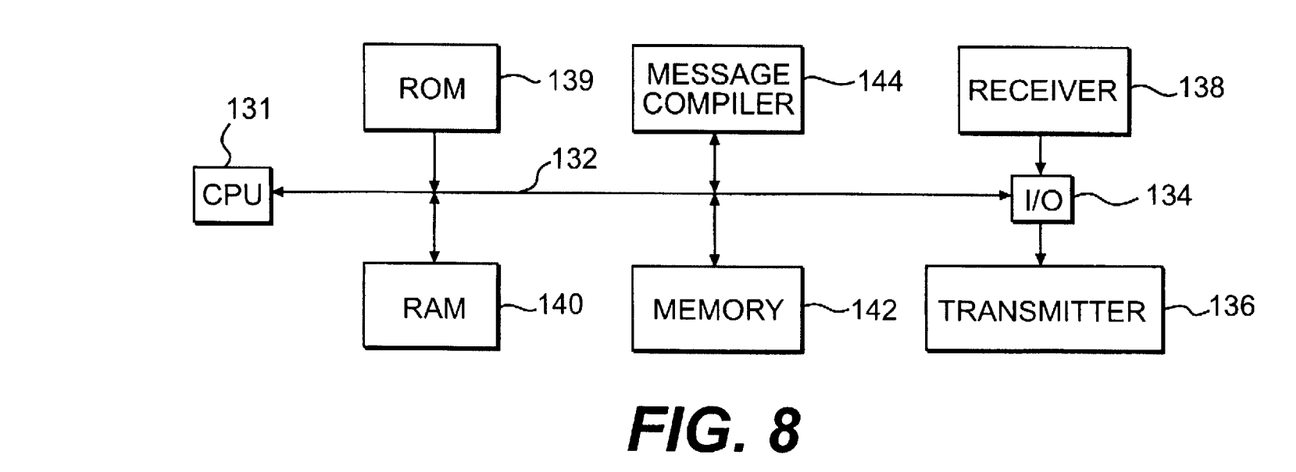
FIG. 8 is a schematic block diagram of the NOC of FIG. 1 in accordance with one embodiment of the invention.

FIG. 8 illustrates the structure of NOC 12 in accordance with one embodiment of the invention. As shown, NOC 12 includes a CPU 131 connected by a system bus 132 to an input/output (I/O) device 134, to which a transmitter 136 and a receiver 138 are connected. A ROM 139 stores an application program appropriate for controlling NOC 12 in accordance with the present invention. A RAM 140 stores sets of canned messages/response options/parameters files for various messaging groups, including the group to which terminals 10 and 14 belong. Thus, RAM 140 stores a set of canned files identical to the set stored in the RAMs of terminals 10 and 14. NOC 12 also includes a memory 142 for storing the identities of the calling and receiving terminals involved in a message that is being relayed, as well as the messages. Message storage is preferred in case receiving terminals do not receive an original message transmission and, thus, retransmission is required. Retention of terminal identities is required so that selected response options received from receiving terminals are correctly relayed to the appropriate calling terminals.

Finally, NOC 12 also includes a message compiler 144 that may be required for message formatting and for adding appropriate codes, such as terminal address codes not included in the messages being relayed by the NOC. This is particularly so in the case of a selected response option which typically does not include the calling terminal address. NOC then refers to the calling terminal identify stored in memory 142 pursuant to determining the calling terminal address that must be included in the transmission of the selected response option, if it is to be relayed to the correct calling terminal.

It will be apparent to those skilled in the art that various modifications and variations can be made in the method of the present invention without departing from the spirit of the invention. Thus, it is intended that the present invention cover the modifications and variations of this invention provided they come within the scope of the appended claims and their equivalents.

What is claimed is:

1. A method of communicating messages between subscribers to an electronic messaging network, comprising the steps of:

maintaining, at a network operation center, a first file of canned messages and message codes respectively assigned to the canned messages;

maintaining at a first terminal of a first subscriber a second file of canned messages corresponding to the first file;

selecting an appropriate canned message from the second file for transmission to a second terminal of a designated second subscriber;

sending the message code assigned to the selected canned message to the network operation center;

retrieving the selected canned message from the first file using the message code received from the first terminal;

determining whether the second terminal can receive the canned message in a text form or message code form; and communicating the selected canned message to the second terminal in either message code form or text code form in response to the determination.

2. The method defined in claim 1, further including the step of updating the first and second canned message files.

3. The method defined in claim 1, further including the step of displaying the selected canned message at the second terminal.

4. The method defined in claim 3, further including the step of adding a parameter to the canned message selected from the second file;
the sending step including the step of sending the added parameter with the assigned message code to the network operation center;
the communicating step including the step of communicating the added parameter with the selected canned message to the second terminal; and
the displaying step including the step of displaying the selected canned message with the added parameter incorporated therein.

5. The method defined in claim 3, further including the steps of:
adding multiple response options to the canned message selected from the second file;
the sending step including the step of sending the added multiple response options with the assigned message code to the network operation center;
the communicating step including the step of communicating the added multiple response options with the selected canned message to the second terminal; and
the displaying step including the step of displaying the selected canned message together with the added multiple response options;
selecting one of the multiple response options at the second terminal;
communicating the selected response option to the network routing the selected response option from the network operation center to the first terminal; and
displaying the selected response option at the first terminal.

6. The method defined in claim 5, further including the step of adding a parameter to the canned message selected from the second file;
the sending step further including the step of sending the added parameter to the network operation center together with the assigned message code and the multiple response options;
the communicating step further including the step of communicating the selected canned message, multiple response options, and added parameter to the second terminal; and
the displaying step at the second terminal further including the step of displaying the selected canned message, added parameter, and multiple response options.

7. The method defined in claim 6, further including the step of correspondingly updating the first and second canned message files.

8. A method of communicating messages between subscribers to an electronic messaging network, comprising the steps of:
maintaining, at a network operation center, a first file of canned messages and message codes respectively assigned to the canned messages;
maintaining at a first terminal of a first subscriber, a second file of canned messages and message codes corresponding to the first file;
maintaining, at a second terminal of a second subscriber, a third file of canned messages and message codes corresponding to the first file;
selecting an appropriate canned message from the second file for transmission to the second terminal;
sending the message code assigned to the selected canned message to the network operation center;
relaying the message code assigned to the selected canned message from the network operation center to the second terminal;
retrieving the selected canned message from the third file using the assigned message code received from the network operation center; and
displaying the selected canned message retrieved from the third file.

9. The method defined in claim 8, further including the step of updating the first, second, and third canned message files.

10. The method defined in claim 8, further including the step of adding a parameter to the canned message selected from the second file;
the sending step including the step of sending the added parameter with the assigned message code to the network operation center;
the relaying step including the step of relaying the added parameter with the assigned message code to the second terminal; and
the displaying step including the step of displaying the selected canned message with the added parameter incorporated therein.

11. The method defined in claim 8, further including the steps of:
adding multiple response options to the canned message selected from the second file;
the sending step including the step of sending the added multiple response options with the assigned message code to the network operation center;
the relaying step including the step of relaying the added multiple response options with the assigned message code to the second terminal; and
the displaying step including the step of displaying the selected canned message together with the added multiple response options;
selecting one of the multiple response options at the second terminal;
communicating the selected response option to the network operation center;
routing the selected response option from the network operation center to the first terminal; and
displaying the selected response option at the first terminal.

12. The method defined in claim 11, further including the steps of:
maintaining at the network operation center, a fourth file of canned multiple response options and response codes respectively assigned to the canned multiple response options;
maintaining at the first terminal, a fifth file of canned multiple response options and response codes corresponding to the fourth file; and
maintaining, at the second terminal, a sixth file of canned multiple response options and response codes corresponding to the fourth file;
wherein the selecting step further includes
the step of selecting appropriate canned multiple response options from the fifth file;
the sending step further includes the step of sending the response codes assigned to the selected multiple response options together with the message code to the network operation center;

the relaying step further includes the step of relaying the message and response codes from the network operation center to the second terminal; and the retrieving step further includes the step of retrieving the selected canned multiple response options from the sixth file using the assigned response codes received from the network operation center.

13. The method defined in claim 12, further including the step of adding a parameter to the canned message selected from the second file;

the sending step further including the step of sending the added parameter to the network operation center together with the assigned message and response codes;

the relaying step further including the step of relaying the added parameter with the assigned message and response codes to the second terminal, and the displaying step at the second terminal further including the step of displaying the selected canned message and multiple response options with the added parameter incorporated therein.

14. The method defined in claim 13, further including the step of correspondingly updating the first through sixth files.

15. A network operation center for use in an electronic messaging network, comprising:

a memory storing a file of canned messages in text form, each canned message having a unique, abbreviated message code assigned thereto;

a receiver for receiving a message code from a calling terminal included in the network;

means responsive to the received message code for retrieving from the memory the canned message assigned thereto;

means for determining whether a receiving terminal in the network can receive the canned message in text form or message code form; and a transmitter for transmitting the retrieved canned message in text form or message code form in response to the determining means.

16. The network operation center defined in claim 15, the determining means routing the received message code directly to the transmitter upon determination that the receiving terminal can receive the canned message in message code form.

17. The network operation center defined in claim 15, further including means for updating the canned message file stored in the memory and a corresponding canned message file stored in a memory in at least the calling terminal.

18. The network operation center defined in claim 15, wherein the memory stores a separate file of canned multiple response options having response codes respectively assigned thereto;

said responsive means further including means for retrieving from the memory those canned multiple response options assigned to response codes received from the calling terminal by the receiver, the retrieved canned message and multiple response options being transmitted to the receiving terminal by the transmitter; and the network operation center further including means for routing a selected canned multiple response option received from the receiving terminal to the calling terminal in either text or response code form.

19. A message terminal for use in an electronic messaging network, comprising:

a memory storing a file of canned messages and message codes respectively assigned thereto and a file of canned multiple response options and response codes respectively assigned thereto;

means for retrieving the file of canned messages and the file of canned multiple response options from the memory;

a display for displaying the canned messages and the multiple response options in the retrieved file;

means for selecting one of the canned messages and at least one of the multiple response options appropriate for the selected canned message for communication to a designated other message terminal; and a transmitter for transmitting the message code assigned to the selected canned message and the response code assigned to the at least one multiple response option over a communications link of the network.

20. The message terminal defined in claim 19, further including means for adding parameters to the selected canned message for inclusion with the assigned message code transmitted over the communications link.

21. A message terminal for use in an electronic messaging network, comprising:;

a memory storing a file of canned messages, and message codes respectively assigned thereto and a file of canned multiple response options and response codes respectively assigned thereto;

means for retrieving the file of canned messages and message codes from the memory;

a display for displaying the canned messages in the retrieved file;

means for selecting one of the canned messages for communication to a designated other message terminal and for selecting multiple response options appropriate for the selected canned message;

a message compiler for compiling the assigned message code and the response codes assigned to the selected multiple response options into a message for transmission by the transmitter; and a transmitter for transmitting the message code assigned to the selected canned message over a communications link of the network.

* * * * *

UNITED STATES PATENT AND TRADEMARK OFFICE
CERTIFICATE OF CORRECTION

PATENT NO.: 5,894,506

DATED: April 13, 1999

INVENTOR: Gregory J. Pinter

It is certified that an error appears in the above-identified patent and that said Letters Patent is hereby corrected as shown below:

Claim 5, column 9, line 34, after "work" insert --operation center;-- then start a new indented line beginning with "routing".

Signed and Sealed this

Fourteenth Day of September, 1999

Attest:

Q. TODD DICKINSON

*Attesting Officer*     *Acting Commissioner of Patents and Trademarks*